(12) United States Patent
Reichart et al.

(10) Patent No.: US 9,315,088 B2
(45) Date of Patent: *Apr. 19, 2016

(54) METHOD FOR GENERATING ELECTRICITY FROM SOLAR PANELS

(75) Inventors: Chris John Reichart, Miramar, FL (US); Gerald Gilbert Glass, Miramar, FL (US)

(73) Assignee: Green Solar Transportation LLC, Miramar, FL (US)

( * ) Notice: Subject to any disclaimer, the term of this patent is extended or adjusted under 35 U.S.C. 154(b) by 658 days.

This patent is subject to a terminal disclaimer.

(21) Appl. No.: 12/426,927

(22) Filed: Apr. 20, 2009

(65) Prior Publication Data
US 2010/0263703 A1 Oct. 21, 2010

(51) Int. Cl.
| | |
|---|---|
| *B60H 1/00* | (2006.01) |
| *B60L 1/00* | (2006.01) |
| *B60L 11/18* | (2006.01) |
| *H02J 7/35* | (2006.01) |
| *H01M 10/44* | (2006.01) |
| *B60L 8/00* | (2006.01) |
| *F25B 27/00* | (2006.01) |

(52) U.S. Cl.
CPC ........ *B60H 1/00428* (2013.01); *B60H 1/00014* (2013.01); *B60H 1/00364* (2013.01); *B60L 1/00* (2013.01); *B60L 8/003* (2013.01); *B60L 11/1861* (2013.01); *H01M 10/44* (2013.01); *H02J 7/35* (2013.01); *B60L 2200/28* (2013.01); *F25B 27/002* (2013.01); *Y02B 10/12* (2013.01); *Y02B 10/20* (2013.01); *Y02B 10/24* (2013.01); *Y02T 10/7083* (2013.01)

(58) Field of Classification Search
USPC .......................................................... 136/244
See application file for complete search history.

(56) References Cited

U.S. PATENT DOCUMENTS

| | | | |
|---|---|---|---|
| 4,602,694 A | | 7/1986 | Weldin |
| 4,725,740 A | * | 2/1988 | Nakata ............................ 307/64 |
| 4,742,291 A | * | 5/1988 | Bobier et al. ................. 320/101 |
| 5,148,736 A | | 9/1992 | Juang |
| 5,680,907 A | | 10/1997 | Weihe |
| 5,703,468 A | * | 12/1997 | Petrillo ......................... 320/101 |
| 5,725,062 A | | 3/1998 | Fronek |
| 6,380,481 B1 | * | 4/2002 | Muller .......................... 136/244 |
| 6,396,239 B1 | * | 5/2002 | Benn et al. .................... 320/101 |
| 7,529,110 B1 | * | 5/2009 | Haines ............................ 363/65 |
| 2003/0009954 A1 | * | 1/2003 | Bradley ......................... 52/79.1 |
| 2005/0284035 A1 | * | 12/2005 | DeOvando et al. ............ 52/79.1 |
| 2007/0296223 A1 | * | 12/2007 | Saylor ........................... 290/1 R |
| 2008/0190047 A1 | * | 8/2008 | Allen ........................... 52/173.3 |

FOREIGN PATENT DOCUMENTS

WO WO2007/025096 A1 * 3/2007 ................ H02J 7/00

* cited by examiner

*Primary Examiner* — Devina Pillay
(74) *Attorney, Agent, or Firm* — Dinsmore & Shohl LL

(57) ABSTRACT

A method for generating electricity from solar power to an air handling unit or an electrical system for a tractor/trailer, relying on a photovoltaic panels (1) DC disconnects (2,3); charge controller (4); batteries (5); air handling unit or an electrical system (7); electrical wires, and fuses. The photovoltaic panel(s) will generate electrical power that will provide sufficient power to run the air handling unit or an electrical system.

10 Claims, 2 Drawing Sheets

METHOD FOR GENERATING ELECTRICITY FROM SOLAR PANELS

CROSS-REFERENCE TO RELATED APPLICATIONS

Not Applicable

SEQUENCE LISTING OR PROGRAM

Not Applicable

BACKGROUND

1. Field

This application relates to solar electricity generated by photovoltaic panels and the application to run an air handling unit or an electrical system for a semi tractor/trailer truck, recreational vehicle, and mobile homes (collectively referred to as tractor/trailer.)

2. Prior Art

This method relates to the solar power used to charge batteries specifically designed and dedicated to the operation of an air conditioning air handler or an electrical system for vehicles, such as tractor trailers, recreational vehicles and mobile homes (collectively referred to as "Vehicle" or "Tractor/trailer"). Solar power inventions have been around for a while, but no invention was ever created specifically to run the air conditioner (AC) handling unit or an electrical system of a vehicle described herein. The average amount of power output generated by our method and unit is specifically designed to power the vehicle's air conditioner handling unit but it could be used to supply energy to an electrical system.

Examples of solar-power generators for vehicles are described in the following documents:

U.S. Pat. No. 5,725,062, which was issued to Froneck on Mar. 10, 1998 described a vehicle top solar power generator, where the solar panel is mounted on the top of the vehicle.

U.S. Pat. No. 4,602,694, which was issued to Weldin on Jul. 29, 1986, was limited to a detailed combination of a motor, a generator, a traction wheel and other devices.

U.S. Pat. No. 5,148,736 which was issued to Juang on Sep. 22, 1992, described an automatic solar-powered car ventilator.

U.S. Pat. No. 5,680,907, which was issued to Weihe on Oct. 28, 1997, described an auxiliary solar-power automobile drive system which would be an alternative source of power for the primary source of fossil fuel energy. This provided the logic but not a solution to provide enough solar power to an air handling unit or an electrical system for a tractor/trailer.

U.S. Pat. No. 6,380,481 which was issued to Muller on Apr. 30, 2002, involved solar panels which were used but they were retractable and the system was designed to run with the assistance of kinetic energy.

Our method involves a unit that is permanently affixed to the vehicle. It is designed to provide a specific service, which is an alternate power source for the operation of an air conditioning system's handler unit or an electrical system that would otherwise require the costly operation of the main drive engine while the vehicle is parked or while it remains stationary for any significant period of time. Our method will greatly reduce the unnecessary idling of such vehicle or equipment, which will increase compliance with State and Federal Idling Laws.

In a 1987 article, McCosh, D. "Racing with the Sun", *Popular Science Magazine*, November 1987, McCosh noted that solar energy was a great source of electricity. There was no additional mention was made about powering the AC units or an electrical system. Back in 1987 McCosh was hoping for a technical breakthrough which would reduce the cost of solar panels, and now 22 years later we have the method to generate electricity for the purpose of running an AC unit or an electrical system for a vehicle for a fraction of the cost, as sought in 1987.

In his book, Tertzakian, P. "A Thousand Barrels a Second: The Coming Oil Break Point and the Challenges Facing an Energy Dependent World", *McGraw-Hill Professional*, 2006, 8, 23, 79, Tertzakian explained the importance of getting away from the "oil only world" we live in and start to build a portfolio of energy sources. Solar power is mentioned in his book as an important part of such an energy portfolio. This method fits Tertzakian's description perfectly as we are not replacing the power source of the vehicle, but we are providing an additional power source that will be added to the overall power use and efficiency of the vehicle, specifically in the AC handling or an electrical system power usage. If the AC handling unit or an electrical system is ran with some or all of his power consumption coming from solar energy the overall fuel use by the vehicle will drop, and therefore a saving will start to be realized immediately by the consumer.

Finding a replacement for oil fuels is the main purpose of several books and authors in the recent years. In his book Campbell, C. J. "Oil Crisis," *multi-science publishing*, 2005, 303, also brought up the necessity of finding alternative energy sources.

SUMMARY

In light of the publicly perceived need for solar energy for transportation vehicles and/or at minimum the supplementation of the power source for the vehicle, the object of our method is to provide a solar supplemental power source to the vehicle AC handling unit or an electrical system. This document will describe the construction of a device capable of providing a solar energy power source to operate a vehicle's AC handling unit or an electrical system. This method is powered by solar power and is designed using readily available products. The solar output of this device is approximately 816 Watts, 33 Volts and 24.6 Amperes. The system can be configured for different levels of desired power, current and/or voltages, but our system is optimized for usage at this configuration. The air handling unit is powered by DC power and is designed to move approximately 9000 BTU's (British thermal unit). It requires approximately 24 Volts and 25 Amperes for proper and efficient operation, which is well within the capabilities of our system. Backup power is provided through the use of batteries. The batteries used for this project are approximately 12 Volts, 290 amperes per hour, but can be configured to meet the 24 Volts at 870 amperes per hour, desired application. Power from the solar power system and battery backup is regulated by means of a "charge controller." This device provides optimal power usage from the panels while regulating the amount of charge going to the batteries and air handling unit. The Direct Current (DC) disconnect in this system provides an extra layer of safety and facilitate efficient interconnection of the unit with tractor/trailer.

All of the energy generated by the solar panels is stored in batteries which have the following characteristics:

Completely sealed valve regulated;
Flame arresting pressure regulated safety sealing valves;
Operating pressure management and protection against atmospheric contamination;

Computer-aided 99.994% pure heavy-duty lead calcium grid designs;

Tank formed plates, which guarantees evenly formed and capacity matched plates;

Anchored plate groups, to guard against vibration;

Double insulating micro porous glass fiber separators;

Measured and immobilized electrolyte, for a wide range of operating temperatures, and low self discharge rates High impact reinforced strength copolymer polypropylene cases with flat top designed covers that are rugged and vibration resistant;

Thermally welded case to cover bonds that eliminate leakage;

Copper and stainless steel alloy terminals and hardware;

Multi-terminal options;

Terminal protectors;

Removable carry handles; and

Classified as "NON-SPILLABLE BATTERY" Not restricted for Air (IATA/ICAO) Provision 67, Surface (DOT-CFR-HMR49) or Water (Classified as non-hazardous per IMDG amendment 27) transportation, compatible with sensitive electronic equipment, Quality Assurance processes with ISO (4400/992579), QS and TUV Certification EMC tested, CE, ETTS Germany (G4M19906-9202-E-16), Tellcordia and Bellcore compliant, UL recognized and approved components (MH29050).

The method utilizes electrical connections with heavy duty cables with a zinc die-cast plug housing. Which is reinforced for durability, good recoil memory, chemical resistance and abrasion resistance. A temperature rating of −90° F. to 125° F. (−68° C. to 52° C.), unbreakable PERMAPLUGS™ featuring Dupont® patented material, which meets SAE J560. Large finger grips for coupling/uncoupling, even with gloves on. Extended plug interior for easy maintenance, protected with anti-corrosive non-conductive, dielectric lithium grease. All cable assemblies are rated for 12 volt systems. All electrical wires connect with the STA-DRY® Wire Insertion Socket, 7-Way #16-720D, with split brass pins along with Anti-Corrosive Dupont Super-Tuff Nylon® housing & lid and stainless steel hinge pin & spring, with inner cavity sealed to prevent contaminants from passing to the wire harness. Extended front barrels for additional cable support, slanted 5° for moisture drain, and elongated holes for mounting adaptability.

All electricity is generated by photovoltaic laminate solar panels. Each solar panel has the following characteristics: rated power (Pmax) 136 Watts, production tolerance+/−5%, by-pass Diodes connected across every solar cell to protect the solar cell from power loss in case of partial shading or damage of individual solar cells while other cells are exposed to full sunlight.

The adhesive to secure the unit to the vehicle's roof is an ethylene propylene copolymer adhesive-sealant, with microbial inhibitor, high temperature and low light performance. The adhesive is flexible and lightweight, weighting approximately one pound per square foot, compared to five pounds per square foot for standard adhesives. The unit is adhered directly to the roof without penetrations or perforations which is approved by state revenue departments for tax incentives and rebates.

The logical center for this method is a charge controller. The charge controller we selected has the following characteristics: PWM series battery charging (not shunt); 3-position battery select (gel, sealed or flooded); very accurate control and measurement jumper to eliminate telecom noise; parallel for up to 300 Amperes temperature compensation; tropicalization: conformal coating, stainless-steel fasteners & anodized aluminum heat sink, no switching or measurement in the grounded leg, 100% solid state, very low voltage drops, current compensated low voltage disconnect, leds for battery status and faults indication, capable of 25% overloads, remote battery voltage sense terminals. The charge controller has the following electronic protections: short-circuit for solar and load, overload for solar and load, reverse polarity, reverse current at night, high voltage disconnect, high temperature disconnect, lightning and transient surge protection, loads protected from voltage spikes, automatic recovery with all protections.

This method is designed to provide for approximately 34 hours of operation, with a requirement of approximately 4 hours of sunlight for a full charge. The photovoltaic panels used in this method are amorphous silicon. By the properties of its construction the panels are capable of using different spectrums of light in which to operate and allow for a broader range of usable sunlight.

The average AC handling unit requires 600 Watts for operation. Our method generates approximately 800 Watts, which is sufficient to provide power to the AC handling unit or an electrical system. The surplus provides enough power for the charge controller to maintain the necessary charge on the battery to extend battery life. Our method operates for approximately 34 hours with no sunlight.

DRAWINGS

Figures

The method for generating electricity from solar panels to run an air conditioning unit or an electrical system is described by the appended claims in relation to the description of a preferred embodiment with reference to the following drawings which are described briefly as follows:

DETAILED DESCRIPTION

Figure 1:
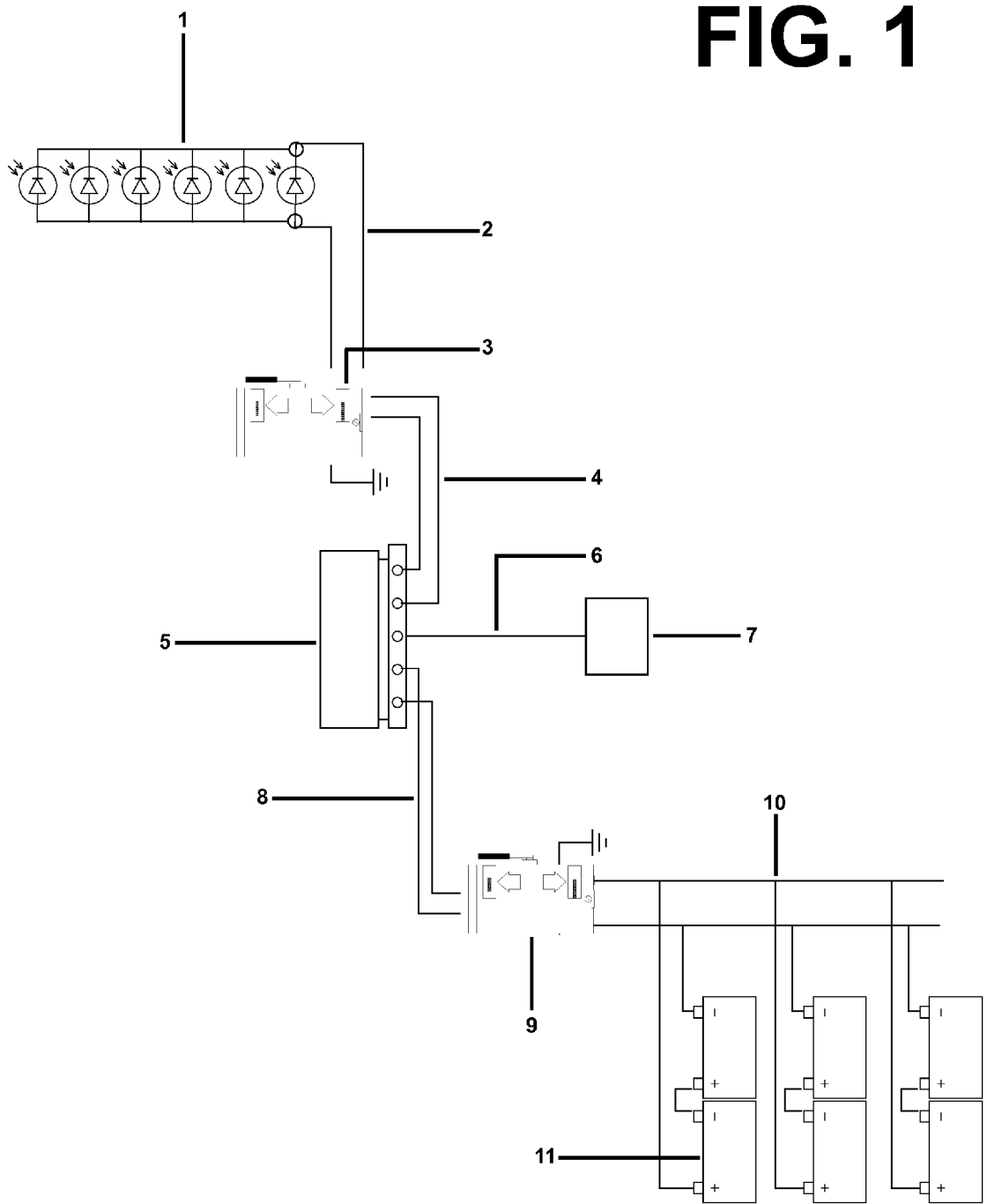
FIG. 1 is the electrical diagram of the method.
Figure 2:
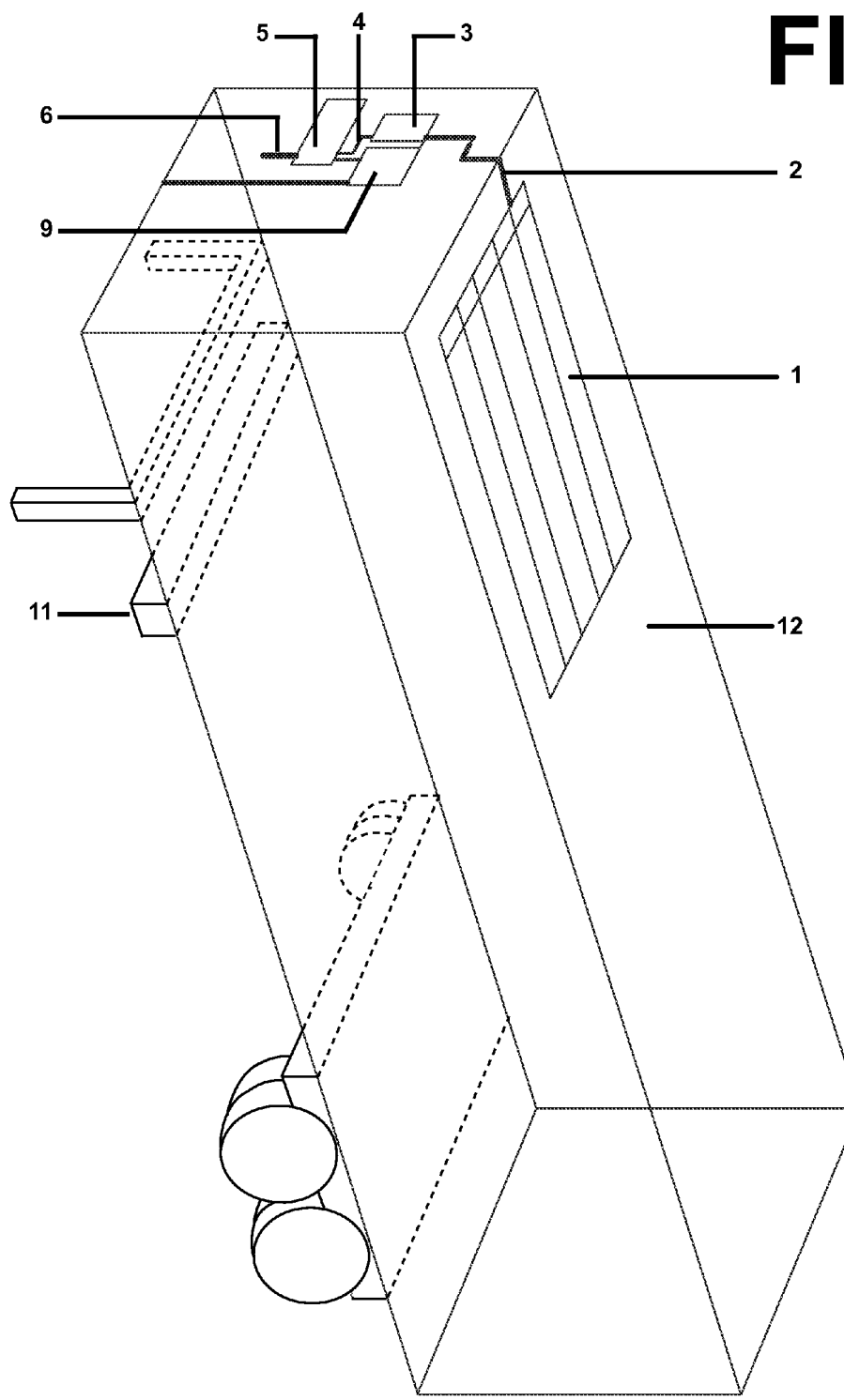
FIG. 2 is a partially cutaway top view.

FIGS. 1 and 2—First Embodiment

Reference is made first to FIG. 1. Photovoltaic (PV) panels 1 that receives solar energy. The electricity generated by the PV panels 1 is transmitted via a wire 2, to a DC Disconnect 3 (DCD). If the DCD circuit 3 is closed, the electricity generated by the PV panels 1 is transmitted via a wire 4 to a charge controller 5. The charge controller 5 is designed to direct the electrical current from the PV panels 1 to a primary load 7 in this embodiment an AC Handling Unit 7 via a wire 6. If the primary load 7 is not receiving the electricity generated by the PV panels 1 the charge controller 5 sends the electricity via a wire 8 to a second DC Disconnect (DCD) 9. If the DCD 9 is closed, the electricity sent by the charge controller 5 is transmitted via a wire 10, to the batteries 11. The batteries 11 store the electricity generated by the PV panels 1. When there is no electricity generated by the PV panels 1 the charge controller 5 allows the electricity stored in the batteries 11 to be transmitted via wire 10, then via DCD 9 and wire 8, to the primary load 7. The charge controller 5 has the capability to be programmed to understand what are the circuit's the current needs. This is based on the program set in the charger controller 5 memory. The unit will be able to make logical decisions (based on the charger programmed data). If the load 7 needs power, the charge controller 5 sends electrical power to the load. If the batteries 11 are low in charge, the charge controller 5 sends power to the batteries 11.

As shown in FIG. 2, the batteries 11 will be assembled and installed under the (vehicle's) truck trailer carriage. Following the transportation regulations with a weight of approximately 1,000 pounds, the PV panels 1 will be assembled and installed on the top of the trailer. The wire 2 makes an approximately 90° bend and comes down to the side of the trailer where it is going to be connected with the DCD 3, which is assembled and installed on the front of the trailer 12. From the DCD 3, the wire 4 brings the electricity generated by the PV panels 1 to the charge controller 5 which is also mounted to the front of the trailer 12. The DCD 9 is also assembled on the front of the trailer 12. Safety is of great concern of this invention. As such, both DC Disconnects 3 and 9 are in installed in this manner and method to provide an extra layer of safety and to facilitate an efficient interconnection of method for generating electricity from solar panels with its air conditioning unit. The vehicle operator can safely reach the controls for the DCD 3 or the DCD 4 which are placed on the side of the trailer 12, and disconnect the PV panels 1 for any necessary service, without risk of getting an electric shock, since the PV panels 1 are always generating electricity when exposed to light. The same principle is applied to the DC disconnect 9 if service needs to be performed to the batteries 11, the operator can safely close the switch in the DCD 9 and work on the batteries without the risk of an electrical shock.

This method was conceived to work as two separate systems with one point of interconnection being the charge controller 5. The first system will be comprised of the PV panels 1, the DCD 3 and the charge controller 5. The second system will be comprised by the batteries 11, the DCD 9 and the charge controller 5.

After our method is completed and attached to the trailer 12, our method will generate enough power to provide the load, which could be an AC handling unit. Although the foregoing invention has being described in some detail by way of illustration and example, for purposes of clarity and understanding, it is obvious that certain changes and modifications may be practiced within the scope of the appended claims.

Other Embodiments

As described in the first embodiment the load 7 can be an electrical equipment that is not an air handling unit. The application of the method will be the same, and the technical specifications will remain the same, but the electrical equipment or load will of a different kind, the system can be reconfigured to generate less electricity if necessary, and based on today's technology, only an air handling unit will have the need for the amount of electrical current our method generates. Also if future technologies arise that would require more electricity this machine capabilities can be extended by adding more solar panels 1 and more batteries 11.

We claim:

1. A trailer mounted solar power system comprising:
   a trailer configured for towing as part of a tractor trailer, the trailer having a roof, a front, a back and a pair of sides extending therebetween;
   at least one photovoltaic solar panel mounted to the roof of the trailer;
   at least one electrical load of the trailer;
   at least one battery;
   at least one charge controller electrically connected between the at least one solar panel, the at least one electrical load and the at least one battery, and configured to control the routing of power therebetween;
   a first DC disconnect between the at least one solar panel and the at least one charge controller; and
   a second DC disconnect between the at least one battery and the at least one charge controller;
   wherein the charge controller and the electrical load can be completely isolated from any power source by opening the first and second DC disconnects;
   wherein controls for the first and second DC disconnects are located on one of the pair of sides of the trailer for safe operation by an operator; and
   wherein the first and second DC disconnects are mounted on the front of the trailer separately from the controls therefor.

2. The system of claim 1, wherein the at least one electrical load is an air handling unit for the tractor trailer.

3. The system of claim 1, wherein the charge controlled is adapted for pulse width modulated (PWM) battery charging.

4. The system of claim 1, wherein the at least one charge controller is configured to automatically:
   detect solar panel power generation;
   detect electrical load power consumption;
   detect battery charge; and
   selectively route power between the at least one solar panel, the at least one electrical load, and the at least one battery dependent on the detected power generation, power consumption and battery charge.

5. The system of claim 1, wherein the charge controller includes at least one of: short-circuit condition protection, overload condition protection, overtemperature protection, and surge protection.

6. The system of claim 5, wherein the charge controller includes all of: short-circuit condition protection, overload condition protection, overtemperature protection, and surge protection.

7. The system of claim 6, wherein the charge controller is further configured to automatically recover following a protective action.

8. The system of claim 1, wherein the at least one charge controller is mounted to the front of the trailer.

9. The system of claim 8, wherein the at least one solar panel is mounted directly to the roof of the trailer by an adhesive.

10. The system of claim 9, wherein the adhesive is an ethylene propylene copolymer adhesive and sealant, with a microbial inhibitor, high temperature and low light performance.

\* \* \* \* \*